United States Patent [19]

Inman et al.

[11] Patent Number: 4,519,290
[45] Date of Patent: May 28, 1985

[54] BRAIDED PREFORM FOR REFRACTORY ARTICLES AND METHOD OF MAKING

[75] Inventors: Frank S. Inman, Brigham City; Donald C. Giedt, Pleasant View, both of Utah; Donald V. Lushis, Newark, Del.

[73] Assignee: Thiokol Corporation, Chicago, Ill.

[21] Appl. No.: 552,565

[22] Filed: Nov. 16, 1983

[51] Int. Cl.³ .......................... D04C 1/02; D04C 1/06; D04C 3/40
[52] U.S. Cl. .............................................. 87/7; 87/1; 87/9; 87/34; 156/148; 244/158 R; 244/158 A; 428/542.8
[58] Field of Search ......................................... 87/5-9, 87/11, 13, 33, 34, 23, 1; 156/148, 149; 428/542.8; 244/158 R, 158 A

[56] References Cited

U.S. PATENT DOCUMENTS 3,583,275  6/1971  Duflos ........................................ 87/7
3,586,058  6/1971  Ahrens et al. ....................... 138/103

Primary Examiner—John Petrakes
Attorney, Agent, or Firm—G. K. White

[57] ABSTRACT

A braided preform fabrication for annular refractory articles such as an integral monolithic throat section and exit cone of a rocket motor nozzle is formed on a mandrel and includes closely spaced radially oriented carbon rods that extend to a uniform length from the mandrel surface and carbon fibers braided on the surface of the mandrel around the carbon rods in a triaxial braid whereby the fabrication has a 4-D fiber architecture. The density of the fabrication is increased by a process that is repeated four times and involves the steps of vacuum impregnation thereof with pitch, subjecting the impregnated preform to high pressure at a temperature that is gradually increased to about 700° C. to convert the pitch to coke and to form the braided preform and mandrel into a billet, and producing graphitization of the braided preform by subjecting the billet to an argon atmosphere in a vacuum furnace at a temperature that is gradually increased to 2,500° C. The mandrel is usually removed from the billet by machining after the second repetition of the process, but it may be removed at any time after the braided preform structure has acquired sufficient strength to withstand the temperature and pressure of further processing.

12 Claims, 13 Drawing Figures

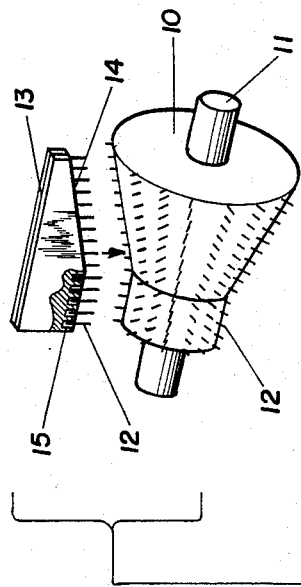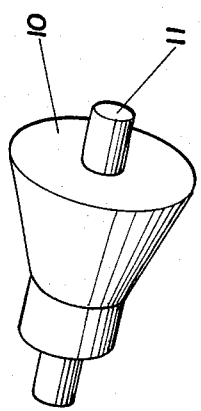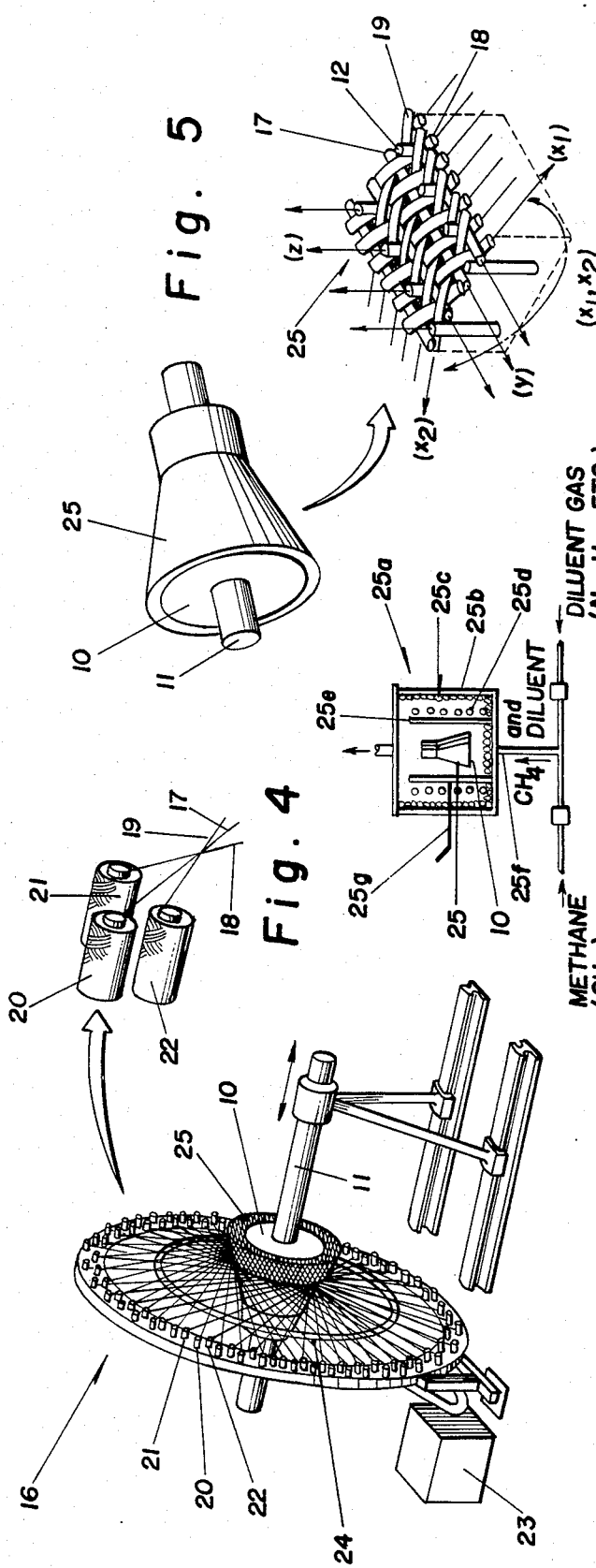

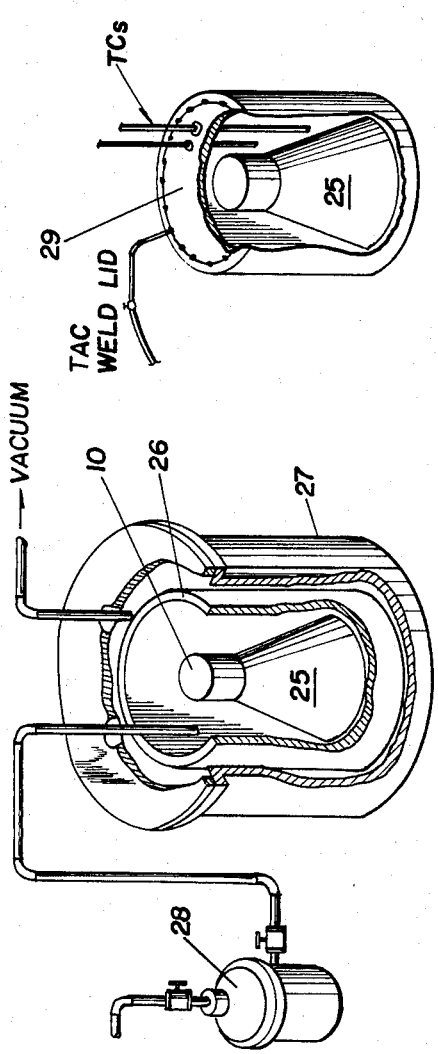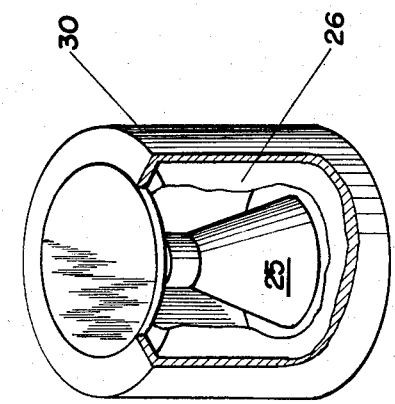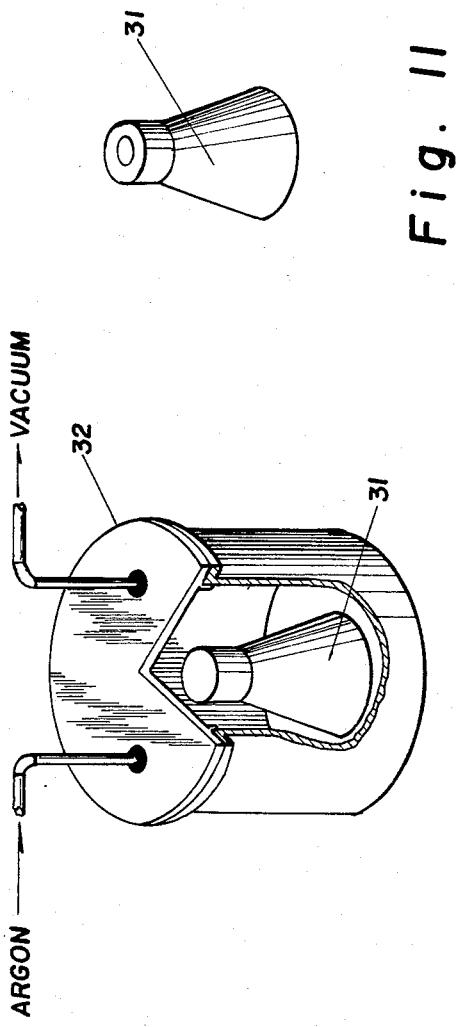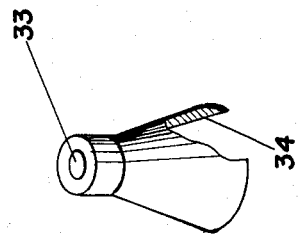

BRAIDED PREFORM FOR REFRACTORY ARTICLES AND METHOD OF MAKING

BACKGROUND OF THE INVENTION

1. Field of the Invention

This invention relates to a method of and apparatus for making refractory articles. More particularly, the invention relates to a method of and apparatus for making carbon fiber reinforced composite components for thrust nozzles of rocket motors.

2. Description of the Prior Art

Solid propellant rocket motors produce gases under high pressure having temperatures of the order of about 6,000° F. These gases contain both erosive and corrosive combustion products. The combustion products pass through the nozzle throat at sonic velocities and through the exit cone at supersonic velocities. The exhaust gases impinge upon the surfaces of the thrust nozzle with the full impact of the heat, erosiveness, and pressure almost immediately upon ignition of the rocket motor. As a consequence, the materials of the nozzle and of the throat, especially, must be capable of withstanding such a severe environment.

Early nozzle throats for solid propellant rocket motors were made of forged tungsten. These functioned satisfactorily for their intended purposes. They were, however, expensive, excessively heavy, and difficult to make. Later nozzle throats have been made with graphite and exit cones have been made of high-temperature plastic composites, wherein, strong, high-temperature resistant fibers are filled with a thermosetting resin. Exit cones are also commonly made of high-temperature resistant cloth impregnated with a resin and formed into the desired shapes under high temperatures and pressures. Such nozzles are satisfactory for use with rocket motors designed prior to about 1980 or rocket motors that operate at relatively cool temperatures. When used in the latest, high-performance rocket motors having propellants that burn at much higher temperatures, however, such nozzles tend to separate or delaminate into the layers of material with which they are formed. As a result, carbon-carbon composites have found application for nozzle manufacture. These materials, however, are costly from a material and labor standpoint, requiring a great deal of hand labor. In-process rejections have also been great, adding to the total unit cost of the nozzles.

There thus exists a need and a demand for an improvement in the methods of and apparatus for making refractory articles, and in particular, nozzles having utility in high-performance rocket motors, of composite materials that are of lower cost from both the material and labor standpoints than those of the prior art.

SUMMARY OF THE INVENTION

A general object of the invention is to provide an improved method of and apparatus for mechanically fabricating a fiber preform for refractory articles such that the fibers are interlocked and thus contribute to an integral unit with a shape conforming to the desired final product.

Another object of the invention is to provide a braided fiber preform for a refractory article comprising a combination of a plurality of layers of a triaxial braid of carbon fibers and a plurality of closely spaced carbon rods each of which is oriented at a substantial angle to the plane of an associated cell of the braided layers.

A further object of the invention is to provide a preform for a refractory article by braiding a plurality of layers of carbon fibers over a rigid mandrel of varying cross-sectional shape to obtain an automatic conformal fitting of the braided fabric to the discrete mandrel shape with a radial component of the fiber structure being provided by a plurality of closely spaced carbon rods that extend radially from the mandrel surface and around which the carbon fibers are braided.

A more specific object of the invention is to provide an improved method of and apparatus for making rocket motor nozzles that are relatively inexpensive, light weight, and impervious to the temperatures and erosiveness produced by combustion of the latest, high-performance rocket motor propellants.

Although the invention may be employed to produce many types of refractory articles, it has particular usefulness in producing throats and/or exit cones for rocket motor nozzles. Since these are annular structures, they can be formed on the surface of a central rigid mandrel. The mandrel may be made of low-density, high-temperature resistant material. In accordance with the invention, rods of carbon fibers are partially inserted into the mandrel, perpendicular to the center line or axis and uniformly distributed over the surface thereof. The rods extend radially with respect to the mandrel, being spaced close together, and provide the radial component of the fiber structure. Oblique carbon or graphite fibers are then passed alternately over and under similar longitudinal fibers, and around the rods, to produce a braided pattern comprising a repetition of unit cells having a 4-D fiber architecture. Layers of fibers are braided upon the mandrel in this pattern until the desired thickness is attained for the finished fiber preform. The fiber preform is rigidized on the mandrel by chemical vapor deposition (CVD) carbon infiltration. This process yields a rigid porous carbon fiber structure bonded together with the CVD carbon. The rigidized preform is then redensified to the final required density. Several "state of the art" procedures are suitable. One method is to continue the CVD carbon infiltration, filling the voids in the preform until the required density is obtained. In an alternate procedure the fiber preform and mandrel are impregnated with a thermo-setting material in a vacuum. Following such impregnation, the preform and mandrel are subjected to heat and pressure to produce graphitization. This process is repeated until the braided structure has the desired density. It is then machined where necessary to achieve the dimensions and finish of the required final product. The mandrel can be removed by machining at any time after the braided structure has acquired sufficient strength to withstand the temperature and pressure of further processing.

BRIEF DESCRIPTION OF THE DRAWINGS

Having summarized the invention, a detailed description follows with reference being made to the accompanying drawings which form part of the specification, of which:

FIG. 1 illustrates a machine contoured male mandrel that may be employed to fabricate a braided preform structure for a rocket motor nozzle;

FIG. 2 shows the mandrel of FIG. 1 with short carbon rods inserted into the surface thereof, extending radially therefrom, and also shows a device that may be used to facilitate such carbon rod insertion;

FIG. 3 is a schematic view of a conventional braiding machine showing carbon fibers being braided on the surface of the mandrel of FIG. 2;

FIG. 4 shows a detail of the arrangement of the axial and braiding spools of the braiding machine of FIG. 3;

FIG. 5 shows the completed contoured construction of the braided fiber preform on the mandrel;

FIG. 6 illustrates several unit cells of the structure of the preformed and layered construction of the braid;

FIG. 6A is a schematic view showing a commonly used CVD facility with the braided fiber preform and mandrel;

FIG. 7 is a view, partially broken away, showing the braided preform and mandrel positioned in a stainless steel container that, in turn, is placed in a vacuum impregnator for vacuum pitch impregnation of the braided fiber preform;

FIG. 8 is a view, partially broken away, showing a stainless steel lid being tack-welded on the stainless steel container with the pitch impregnated braided preform and mandrel contained therein;

FIG. 9 is a view, partially broken away, showing the stainless steel container, with the braided preform and mandrel therein, placed in an autoclave for high pressure impregnation and carbonization of the braided preform;

FIG. 10 is a view, partially broken away, showing the braided preform and mandrel as a billet placed in a vacuum furnace for graphitization of the braided fiber preform;

FIG. 11 shows the braided fiber preform as a billet in a preliminary stage of completion, with the mandrel removed, after graphitization thereof in the vacuum furnace of FIG. 10; and FIG. 12 is a view, partially broken away, showing the completed integral monolithic throat section and exit cone for a rocket motor produced in accordance with the invention.

DESCRIPTION OF THE PREFERRED EMBODIMENTS

The invention has particular utility in the production of throats and exit cones of rocket motor nozzles. The throat and exit cone may be formed separately or as an integrated whole.

As shown in FIG. 1, a mandrel 10 of a high-temperature resistant, low-density material, is formed on a central shaft 11. There are a number of materials on the market that may be employed for this purpose, one being that sold by Fiber Materials, Inc., Biddeford Industrial Park, Biddeford, Me. 04005 under the trademark "Fiber Form." It is essentially a felt-like material made of carbon fibers coated with a resin.

The mandrel 10 is rigid and is made in the approximate shape desired for the inner surface of the resulting rocket nozzle. It is made somewhat smaller than the desired surface, however, to allow for a final machine finishing of the product to be formed thereon.

Short carbon rods 12 are partially inserted into the surface of the mandrel 10 so that they extend radially therefrom to a uniform length that is approximately the same as the desired thickness of the product to be formed. This insertion of the rods 12 can be effected manually after locations for the rods 12 have been marked on the surface of the mandrel 10, or if desired, it can be effected by mechanical means.

As shown in FIG. 2, a useful device for facilitating mechanical insertion of the carbon rods 12 is a long tray 13. This tray 13 is essentially a flat plate or bar having an edge 14 that is shaped to fit the axial or longitudinal external contour of the mandrel 10. The edge 14 contains a row of holes 15 that are slightly larger in diameter than the rods 12 and are spaced apart with the spacing desired for the rods 12 in the mandrel 10. The depth of the holes 15 may be slightly greater than the thickness of the wall of the resulting rocket nozzle.

A carbon rod 12 is inserted in each hole 15. An entire, longitudinal row of the rods 12 can be installed in the mandrel 10 simultaneously and with considerable precision, simply by pressing the loaded tray 13 against the mandrel 10 until the edge 14 of the tray 13 is in contact therewith. The mandrel 10 is then rotated through the desired angular increment and the process is repeated, until all of the rods 12 are installed in the mandrel 10. This method of installing the rods 12 in the mandrel 10 insures uniformity of rod spacing and also uniformity of the radial extent, or length, of the rods 12 from the surface of the mandrel 10.

Carbon or graphite fibers in the form of roving or tow are braided on the surface of the mandrel 10 around the radial rods 12 in contact therewith in a triaxial braid by a conventional braiding machine 16, as illustrated in FIG. 3. As shown in FIG. 4, the carbon fiber strands, in forming a unit cell of the braid, are applied to the mandrel surface and a carbon rod 12 in groups or sets of three, each from its individual carrier or spool. Each group of three has a longitudinal or axial strand 17 which is directed in the plane of the axis of mandrel 10, and two oblique strands 18 and 19 of the same nature as the strand 17. Strands 18 and 19 alternately pass over and under the longitudinal strands 17. Strand 17, as shown in FIG. 4, is drawn from a spool 20, and strands 18 and 19 are drawn from spools 21 and 22, respectively.

Unit cells of the completed contoured preformed and layered construction obtained in this manner are illustrated in FIG. 6 wherein the braided fiber preform is seen to have a 4-D physical characteristic. Specifically, the oblique strands 18 are directed along an axis designated $(X_1)$, the oblique strands 19 are directed along an axis designated $(X_2)$, and the strands 17 are directed along an axis designated Y, the axes $(X_1)$, $(X_2)$ and Y being in substantially the same plane. The carbon rods 12, on the other hand, are directed along an axis designated $(Z)$ that is substantially perpendicular with respect to the plane of the axes $(X_1)$, $(X_2)$ and $(Y)$ of each unit cell.

As seen in FIG. 6, strands 18 are oblique in one sense with respect to the longitudinal strands 17 and the strands 19 are oblique in an opposite sense with respect to the strands 17. Thus, for convenience, strand 18 will be referred to hereinafter as being oblique clockwise with respect to strand 17 and strand 19 as oblique counterclockwise with respect to strand 17.

A braiding machine 16 that may be employed for effecting such a triaxial braid on the surface of mandrel 10 and around the radially positioned carbon rods 12 on the surface thereof is a braider manufactured by New England Butt Company, 304 Pearl Street, Providence, R.I. 02907, and modified by Albany International Research Company, Route 128 at U.S. 1, Dedham, Mass. 02026. An illustration of this type of braiding machine is the illustration on page 15 of the Albany International Annual Report for 1979.

Machine 16 is a 144 spool braider with 72 axial elements and includes a carriage and drive spool unit 23 and a reversing ring 24. In the braiding process, spindles or holders for the sets of carbon fiber braid spools 21 and 22 are movable and are made to traverse undulating circular paths in the opposite directions around the outer periphery of the machine. The holders for the sets of spools 20 which provide the longitudinal or axial fibers or strands 17 are stationary and are mounted parallel to and slightly below the rotating set of holders for spools 21 and 22. The timing of the crossovers of spools 21 and 22 is such that the carbon fiber strands 18 and 19 from the spools interlace with each other and with the carbon fiber strand 17 from the longitudinal spool 20 to form a continuous tubular fabric or braided preform, the braid being triaxial in character.

With the movable carrier strands 18 and 19 aligned at a large helix angle to the longitudinal strand 17, a braided structure is produced that is similar to a conventional woven fabric. This type of triaxial braided structure in combination with the radially positioned and closely space carbon rods 12 provides a braided structure having a four-dimensional (4-D) characteristic. This braided structure has been found to have particular utility in the fabrication of rocket motor nozzles and other types of refractory articles.

By effecting such a braid over a rigid mandrel of varying cross-sectional shapes, there is obtained an automatic conformal fitting of the braided fabric to the discrete mandrel shape. Additionally, by the use of the formation, or reversing ring 24 and a reversing drive 23 in conjunction with the mandrel 10, the mandrel 10 may be made to traverse through the machine 16 past the fabric formation point in both directions sequentially, so as to lay on the mandrel 10 a series of layers of the braid. In this manner there is produced on mandrel 10 a braided preform 25, as indicated in FIGS. 5 and 6 in which the carbon fibers or strands 17, 18 and 19, as formed around carbon rods 12, are continuous throughout, with no major discontinuities at the turnaround points. This has obvious advantages, particularly in the fabrication of short braided structures intended for pressure vessel applications.

In the braiding process as it is normally carried out as a textile process, the spools or carriers revolve in a horizontal plane, and the direction of fabric production is vertical. While this is satisfactory for the production of flexible materials that are to be wound up on a take-up package, it is very inconvenient for braiding over a mandrel for the production of rigid components. In order to overcome this problem, the braiding machine 16, as shown in FIG. 3, has been rotated through 90° so that the plane of rotation of the spools 20, 21 and 22 is vertical and the long axis of the mandrel 10, as represented by the shaft 11, is horizontal. This facilitates the design of the mandrel holding and traversing mechanisms, and minimizes the limitations on the length of the braided article that can be produced. The maximum diameter of the component that can be accommodated in the braider 16, positioned as shown, is set by the geometry of carrier bed and the guides for the carbon fiber strands. In an operative embodiment of the invention, braiding over mandrels that are up to ten feet long (3.05 meters) and sixty inches (1.58 meters) in diameter may be effected.

The extent of coverage that can be achieved in a single pass through the braider is determined by interrelated factors such as the diameter of the mandrel 10 or other workpiece, the rate of traverse, the helix angle of the movable carrier fibers, and the width of the fibers as they lie in the workpiece subsequent to fabric formation. In textile applications, this latter parameter is controlled by both the linear density of the yarn and the amount of twist in the yarn. That is to say, a low twist yarn is able to flatten out and to give a cross-sectional aspect ratio of up to 10:1, which ensures high transverse coverage and low thickness. A yarn with twist is not able to accept this type of cross-sectional distortion and a thicker fabric results. In composite applications such as those involving carbon fibers or strands, flatter strand sections are usually more desirable since the uniformity of the braided product is improved and the number of voids in the structure minimized. The maximum fiber linear density that can be accommodated with the braiding machine 16 is set by the size of the carrier guides and fair leads, which limit the maximum width of the flattened strands to approximately 0.2 inch (0.51 cm.). It is not normally possible to use very high helix angles since this leads to fabrics with highly anisotropic load bearing capability. In the fabrication of nozzles for rocket motors in accordance with the invention, however, such anisotrophy is not deleterious.

The braiding is done with a tensile stress of about 0.25 pounds (113.6 grams) on each of the sets of carbon strands 17, 18 and 19 to ensure proper density. Several different "state of the art" methods are available for increasing the density of the completed braid or braided preform on the mandrel 10. This step of increasing the density of the braided preform has been referred to in the art by the terms "densifying," "densification" and "redensification." The term "redensification" will be used herein as descriptive of a process for increasing the density of the braided preform to a value more nearly the same as that of the carbon fibers of which the preform is made, it being desirable to attain a density of 1.9 for the preform.

A rigidization process may be employed to stabilize the geometry of the braided preform prior to redensification. Chemical vapor deposition (CVD) of carbon into the porous fiber preform is preferred because no carbonization of a thermoset resin matrix is required. A preform density of 0.9 to 1.0 gm./cm.$^3$ is adequate.

The mandrel tends to shrink non-isotropically during the carbonization of the pitch impregnant, thus allowing the braided preform to distort prior to completion of the carbonization cycle. The rigidization tends to bond the 4-D braided structure together at the various fiber cross over points, consequently preserving the "as braided" shape during the subsequent redensification process.

The CVD process is illustrated in FIG. 6A. The braided fiber preform 25 and mandrel 10 are positioned in a CVD autoclave indicated at 25a. As shown, the autoclave 25a comprises a steel vacuum shell 25b, water cooling means 25c, induction coils 25d, and a susceptor 25e. Methane ($CH_4$) and diluent gas ($N_2$, $H_2$, etc.) are introduced into the autoclave 25a through suitable inlet means such as a tube 25f. The temperature within the autoclave 25a is increased by the energization of the induction coils 25d to a level of about 1100° C., a thermocouple 25g being provided in cooperation with suitable electrical control means (not shown) for controlling the energization of the induction coils 25d. The methane and diluent gas diffuses into the structure and deposits carbon. Typically, about 100 hours are required to obtain the desired degree of rigidization.

Three redensification methods for carbon-carbon components are currently in use: (a) Low Pressure Impregnation and Carbonization (LOPIC); High Pressure Impregnation and Carbonization (HIPIC); and Chemical Vapor Deposition (CVD). The LOPIC process uses pressures of 5,000 pounds per square inch (psi) or less and can accommodate pitch, resin or a pitch/resin blend for the raw impregnant. Multiple graphitization cycles (about eight) are required to get a 1.9 density, phenolic resins usually being used for the later cycles. The HIPIC process requires a 15,000 psi impregnation/carbonization and fewer (about four) graphitization cycles to get a density of 1.9. Typically, coal tar pitch is used. CVD redensification is used for thin wall structures because a density gradient usually results in thicker sections. It is also used as a seal coat on carbon-carbon components.

The LOPIC and HIPIC redensification methods both have comparable advantages of "graphitizable material" and "good carbon yield." The HIPIC method, however, requires fewer graphitization cycles to get a desirable density of 1.9 for the final product, and shorter manufacturing lead times. Also, there is a lower probability of processing damage or loss.

Thus, the most advantageous method of obtaining a fully densified rocket motor nozzle is the HIPIC method. When the braided fiber preform 25 has been completed, the portions of the shaft 11 that protrude from the mandrel 10 are removed, as by machining, and the braided fiber preform 25 and mandrel 10 are placed in a stainless steel container 26, as illustrated in FIG. 7. Container 26, in turn, is placed in a vacuum chamber 27 where it is filled under a vacuum pressure of about 40 torr with a hot coal tar pitch at a temperature of about 325° F. (163° C.) from a hot pitch transfer container 28 until the pitch level is about two inches above the height of mandrel 10.

The stainless steel container 26 is then removed from the vacuum chamber 27 and a stainless steel lid 29 therefore is tack-welded thereon. It is then placed in an autoclave 30, as shown in FIG. 8, for about 48 hours. During this time the mandrel 10 and its layers of braiding 25 are subjected to a pressure of about 15,000 pounds per square inch (1,057 kilograms per square centimeter). Simultaneously, the temperature is gradually increased at a rate of about 50° C. per hour until a temperature of about 700° C. is reached. The temperature is maintained at 700° C. for two hours and is then gradually decreased. This process converts the impregnated pitch to coke and forms the mandrel 10 and the braided fiber preform 25 into a billet 31.

The stainless steel container 26 is then removed from the autoclave 30, and billet 31 is removed from the container 26. Excess coke is removed from the billet 31, which is then placed in a vacuum furnace 32 having an argon atmosphere under a vacuum pressure of about 40 torr. There the billet 31 is graphitized for about 80 hours. During this time, the temperature is gradually increased until a temperature of 2,500° C. is reached. After a period of two hours at this temperature, the billet 31 is allowed to cool for about 36 hours.

This entire process, beginning with pitch impregnation of the billet 31, may be repeated until the desired density of the braided fiber preform 25 is attained. Typically, the braided preform 25 attains a density of 1.30 grams/cc in the first cycle of the process, 1.55 grams/cc in the second, 1.80 grams/cc in the third, and 1.90 grams/cc in the fourth repetition or cycle.

The mandrel 10 is usually removed from the billet 24 by machining after the second repetition of the densification process, thereby to produce a billet 31, as shown in FIG. 11. When the fourth cycle or repetition of this process has been completed, the billet 31 is machined as required to produce the integral monolithic throat section 33 and exit cone 34 of the nozzle of a rocket motor, as illustrted in FIG. 12.

Thus, in accordance with the invention, there has been provided an improved method of and apparatus for making refractory articles or products from composite materials. The method and apparatus, in the illustrated embodiment involving an annular structure, comprises the mechanical fabrication on a mandrel of a plural layer triaxial fiber braid containing carbon rods oriented in the radial direction thereby forming a 4-D structure wherein the braided fibers and rods are interlocked and contribute to an integral unit with a shape conforming to the desired final product. Rigidization of the fiber preform on the mandrel is effected by chemical vapor deposition of carbon into the porous preform. The fiber preform and mandrel are impregnated with pitch in a vacuum, and then subjected to heat and pressure to produce graphitization. This process is repeated until the braided structure has the desired density. The billet that is thus formed is machined to achieve the desired dimensions and finish of the final product. The mandrel may be removed from the billet by machining at any time after the braided fiber and rod structure has acquired sufficient strength to withstand the temperature and pressure of further processing.

What is claimed:

1. A braided fiber preform for an annular refractor article comprising the combination of:
   a plurality of closely spaced annularly distributed carbon rods;
   a tubular triaxial braid of carbon fiber strands braided in contact with and around said carbon rods, said braid comprising a repetition of braided unit cells each of which is formed of three strands lying in substantially the same plane, each of said carbon rods being oriented at a substantial angle to the plane of an associated one of said unit cells, and
   a mandrel of high-temperature resistant material, said mandrel having an external contour that is approximately the same as the internal shape desired for the refractory article;
   said carbon rods being inserted in the surface of said mandrel and extending radially therefrom uniformly to an extent approximately the same as that desired for the thickness of the refractory article; and
   said mandrel providing a supporting structure for said braided fiber preform during the braiding thereof.

2. A braided fiber preform as specified in claim 1 wherein each of the strands of the triaxial braid is braided with a tensile stress of about 0.25 pounds.

3. A braided fiber preform as specified in claim 1 wherein said braided preform is porous, and further including
   means to rigidize said braided preform on said mandrel by infiltration of carbon into the porous braided preform by chemical vapor deposition.

4. A braided fiber preform as specified in claim 1:
   wherein the mandrel has an external contour that is approximately the same as the internal shape of the throat and exit cone of a rocket motor; and wherein upon removal of said mandrel there is produced an integral monolithic throat section and exit cone of the nozzle of a rocket motor.

5. A braided fiber preform as specified in claim 1 further including an elongated tray having an edge that is shaped to fit the external contour of said mandrel, said edge containing a row of holes that are slightly larger in diameter than the said carbon rods and which are spaced apart with the spacing desired for the rods in said mandrel, the depth of the holes being slightly greater than the thickness desired for the refractory article, with a carbon rod being inserted in each hole whereby an entire row of carbon rods may be installed in the mandrel simultaneously with precision by pressing the loaded tray against the mandrel until the edge thereof is in contact with the surface of said mandrel.

6. A braided fiber preform for an annular refractory article having a longitudinal contour comprising:
a repetition of braided unit cells in one or more tubular overlying layers, each of which unit cells comprises:
a carbon rod radially oriented with respect to said refractory article, the length of said carbon rod being in accordance with the desired thickness of said refractory article;
a first carbon strand oriented longitudinally with respect to said refractory article and positioned in contact with said carbon rod;
a second carbon strand oriented obliquely clockwise with respect to said first carbon strand and positioned in contact with said carbon rod; and
a third carbon strand oriented obliquely counterclockwise with respect to said first carbon strand and positioned in contact with said carbon rod;
one of said second and third carbon strands passing over said first carbon strand and the other one thereof passing under said first carbon strand; and
a rigid mandrel on which said braided unit cells are formed, said mandrel being made of high temperature resistant material and having an external contour that is approximately the same as the internal shape desired for the refractory article;
said carbon rods being inserted in the surface of said mandrel and extending radially therefrom uniformly to a length approximately the same as that desired for the thickness of said refractory article;
said mandrel providing a supporting structure for said braided fiber preform during the braiding thereof and during subsequent processing to increase the density thereof.

7. A braided fiber preform as specified in claim 6 further including means to facilitate the insertion of said carbon rods into the surface of said mandrel comprising:
an elongated tray having an edge that is shaped to fit the external contour of said mandrel, said edge containing a row of holes which are spaced apart with the spacing desired for the rods in said mandrel, the depth of the holes being substantially the same as the thickness desired for the refractory article, with a carbon rod being inserted in each hole whereby an entire row of carbon rods may be installed in the mandrel simultaneously with precision by pressing said loaded tray against the mandrel until the edge thereof is in contact with the longitudinal contour thereof, and additional rows of carbon rods may be similarly installed in the mandrel by rotating said mandrel appropriate angular increments and repeating the carbon rod installation process.

8. A method of making a braided preform for a refractory article comprising the steps of:
partially inserting a plurality of carbon rods into the exterior surface of an annular mandrel having a longitudinal axis and made of high-temperature resistant, low density material, the mandrel having an external shape that is approximately the same as that desired for the inner surface of the article, with the carbon rods being spaced on the mandrel exterior surface and extending radially therefrom to a length that is approximately the same as the desired thickness of the refractory article;
forming a braided annular fiber preform on the mandrel by braiding carbon fiber strands with a uniform tensile stress on each strand on the exterior surface of the mandrel in contact with and around the carbon rods with the strands applied in groups of three, each group having two oblique strands which are passed alternately over and under a longitudinal strand that is positioned in the plane of the axis of the mandrel, with one of the oblique strands being oblique clockwise with respect to the longitudinal strand and the other of the oblique strands being oblique counterclockwise with respect to the longitudinal strand.

9. A method as specified in claim 8 wherein the tensile stress on each of the carbon fiber strands is about 0.25 pounds.

10. A method as specified in claim 8 further including the steps of inserting the plurality of carbon rods into the exterior surface of the mandrel by the use of an elongated tray having an edge that is shaped to fit the longitudinal contour of the mandrel, the edge containing a row of holes which are spaced apart with the spacing desired for the rods in the mandrel, the depth of the holes being in accordance with the thickness desired for the refractory article, with a rod being inserted in each hole whereby an entire, longitudinal row of holes may be installed in the mandrel simultaneously by pressing the loaded tray against the mandrel until the edge is in contact therewith; and
rotating the mandrel through desired successive angular increments and repeating, each time, the last mentioned step until all of the rods have been inserted in the mandrel thereby to insure uniformity of spacing and of the radial extent of the rods from the surface of the mandrel.

11. A method as specified in claim 8 wherein the braided preform is porous and further including the step of rigidifying the braided preform on the mandrel by infiltration of carbon into the porous braided preform by chemical vapor deposition.

12. A method as specified in claim 8 further including the steps of impregnating the braided preform with a thermosetting material in a vacuum and following such impregnation subjecting the braided preform to heat and pressure to produce graphitization to increase the density of said braided preform, and repeating these steps until the braided preform has the desired density.

* * * * *